US009535712B2

(12) United States Patent
Lewis

(10) Patent No.: US 9,535,712 B2
(45) Date of Patent: Jan. 3, 2017

(54) SYSTEM AND METHOD TO STORE DATA SECURELY FOR FIRMWARE USING READ-PROTECTED STORAGE

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/560,559

(22) Filed: Dec. 4, 2014

(65) Prior Publication Data

US 2015/0154031 A1    Jun. 4, 2015

Related U.S. Application Data

(60) Provisional application No. 61/911,655, filed on Dec. 4, 2013.

(51) Int. Cl.
  *G06F 9/00*   (2006.01)
  *G06F 9/44*   (2006.01)
  *G06F 21/57*  (2013.01)
  *G06F 21/62*  (2013.01)

(52) U.S. Cl.
  CPC ........... *G06F 9/4406* (2013.01); *G06F 21/575* (2013.01); *G06F 21/6209* (2013.01)

(58) Field of Classification Search
  CPC .......................... G06F 9/4406; G06F 21/6209
  USPC .......................................... 713/189–194, 1–2
  See application file for complete search history.

(56) References Cited

U.S. PATENT DOCUMENTS

| | | | | |
|---|---|---|---|---|
| 7,865,646 B1 * | 1/2011 | Falik et al. | ........... | G06F 13/387 710/107 |
| 8,473,717 B2 * | 6/2013 | Hugosson | ............... | G06F 12/08 712/34 |
| 2004/0103299 A1 * | 5/2004 | Zimmer | .................. | G06F 21/57 726/26 |
| 2005/0278551 A1 * | 12/2005 | Goodnow | ............... | G06F 21/76 713/193 |
| 2007/0226478 A1 * | 9/2007 | Rudelic | ............... | G06F 12/1408 713/1 |
| 2007/0226795 A1 * | 9/2007 | Conti | ...................... | G06F 21/74 726/22 |
| 2011/0145598 A1 * | 6/2011 | Smith | ................... | G06F 21/554 713/190 |

(Continued)

OTHER PUBLICATIONS

Zhang et al., "A System Architecture Design Scheme of the Secure Chip Based on SoC," Intelligent Systems and Applications, 2009. ISA 2009. International Workshop on Year: 2009 pp. 1-4.*

(Continued)

*Primary Examiner* — Roderick Tolentino
(74) *Attorney, Agent, or Firm* — McCarter & English, LLP; John S. Curran

(57) ABSTRACT

Embodiments of the present invention store data in read-protected storage for use by firmware and then transfer the data or data related to that stored data into a secure execution environment for use during normal platform operation. The read-protected storage is readable only between a time period after platform reset but before the read-protected storage is locked prior to the operating system being loaded. This read-protected storage is locked prior to executing any untrusted code in normal system memory so that the data in the read-protected storage is not exposed to malicious code execution.

21 Claims, 6 Drawing Sheets

(56) References Cited

U.S. PATENT DOCUMENTS

2011/0307711 A1* 12/2011 Novak .................. G06F 21/575
713/188
2015/0106609 A1* 4/2015 Koszek ................ G06F 9/4405
713/2

OTHER PUBLICATIONS

Yamakita et al., "Phase-based reboot: Reusing operating system execution phases for cheap reboot-based recovery," 2011 IEEE/IFIP 41st International Conference on Dependable Systems & Networks (DSN) Year: 2011 pp. 169-180.*

* cited by examiner

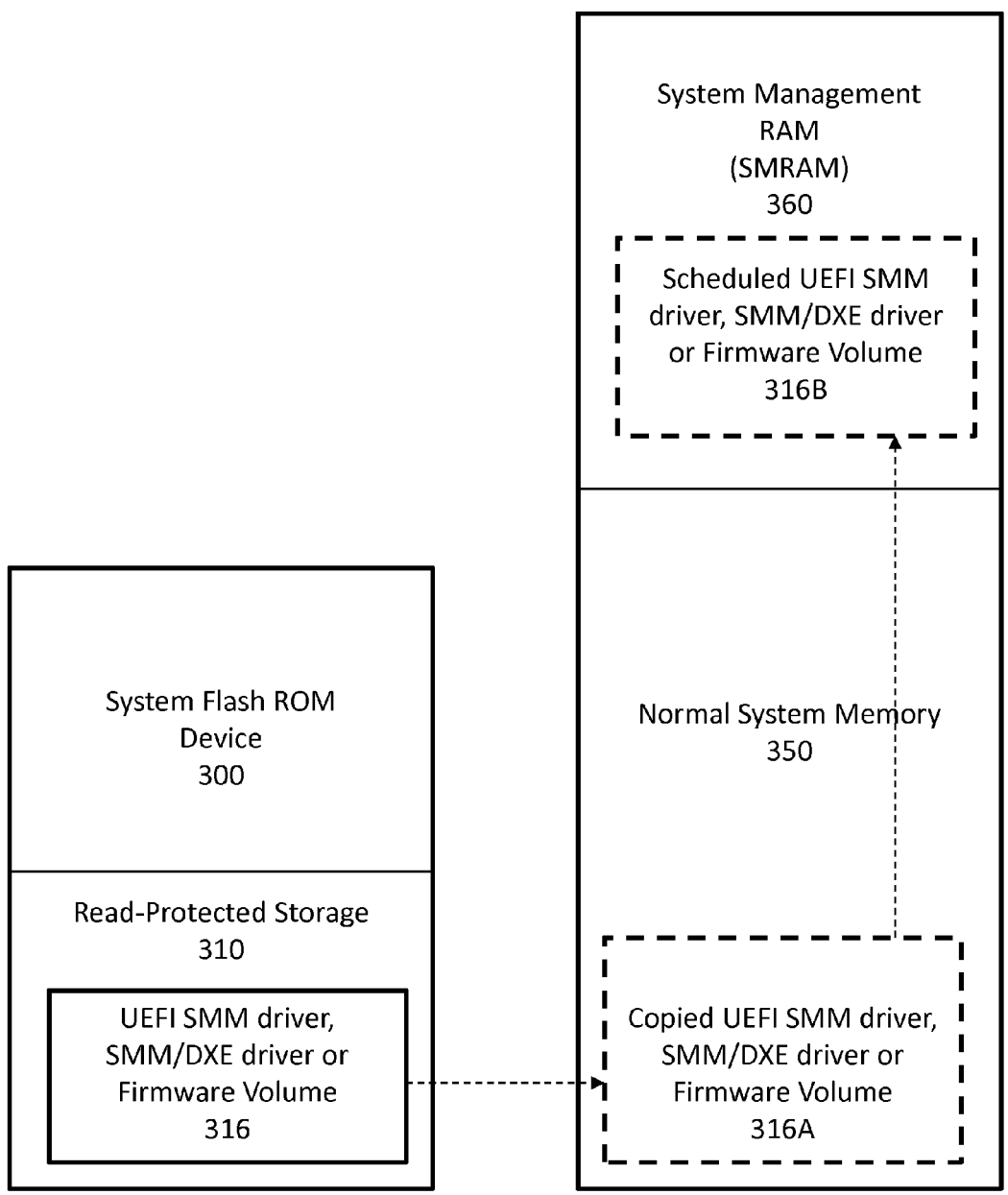

SYSTEM AND METHOD TO STORE DATA SECURELY FOR FIRMWARE USING READ-PROTECTED STORAGE

RELATED APPLICATION

This application is related to, and claims the benefit of, U.S. Provisional Patent Application No. 61/911,655, entitled "System and Method to Store Data Securely for Firmware Using Read-Protected Storage", filed Dec. 4, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons. For example, some firmware is only executable after a computing device has been transitioned from a normal operating mode controlled by the operating system to a secure execution environment controlled by the firmware.

One example of such a secure execution environment is System Management Mode (SMM). A computing device may contain one or more elements known as Central Processing Units (CPUs). Each CPU may have more than one core. These CPUs and CPU cores may have a normal operating mode and a second operating mode called SMM. When the CPU or core is in normal operating mode (when the computing device is being controlled by the operating system) it can access all elements of the computer except certain memory regions exclusively dedicated to SMM. In contrast, when the CPU or core is operating in SMM it is able to access all elements of the computing device including the memory locations allocated for SMM. The CPU or core may be directed to transition from normal operating mode to SMM by a number of triggers called System Management Interrupts (SMI) events. The exact triggers available differ somewhat from among system designs but the result of an SMI being triggered is that execution in main memory is immediately suspended and execution begins at a specific location in SMM protected memory. The secure execution environment provided by SMM allows secure services and applications to execute while being protected from examination by code executing in normal system memory or by hardware devices using Direct Memory Access (DMA). Computing devices supporting the x86 system architecture frequently provide support for SMM. Similar types of secure execution environments may be provided in other platforms such as TrustZone™ in computing devices employing an ARM processor.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier operating system (OS)/firmware interfaces previously used by the industry and commonly known as legacy BIOS (Basic Input Output System).

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the flash ROM device will retain the data indefinitely. When power is first applied to the computing device, the device executes a process called reset which clears the state to a known condition and begins execution of the firmware controlling the boot sequence. The firmware is read from the ROM.

BRIEF SUMMARY

Embodiments of the present invention store data in read-protected storage for use by firmware and then transfer the data, or secondary data related to that stored data, into secure memory locations allocated for a secure execution environment for use during normal platform operation. The read-protected storage is readable only between a time period after platform reset but before the read-protected storage is locked prior to the operating system being loaded. This read-protected storage is locked prior to executing any untrusted code in normal system memory so that the data in the read-protected storage is not exposed to malicious code execution. In one embodiment, the data in the read-protected storage includes a cryptographic key which is used to decrypt secondary data that includes a block of keys into the secure execution environment. In another embodiment, the data in read-protected storage includes a cryptographic key which is used to decrypt secondary data that includes drivers or a firmware volume which is copied into normal memory before being loaded into the secure execution environment. In an additional embodiment, the read-protected storage contents or a portion thereof includes non-encrypted drivers or a firmware volume that are copied to normal system memory before being loaded into the secure execution environment.

In one embodiment, a computing device-implemented method for using read-protected storage to store data for firmware use includes executing firmware to read data from read-protected storage during a boot sequence following a reset of the computing device. The read-protected storage is non-volatile and readable only during a time period between the reset of the computing device and a subsequent locking of the read-protected storage that prevents any further reads of the data in the read-protected storage until a subsequent reset of a memory device providing the read-protected storage is performed. The method also includes copying the data or secondary data related to the data to a secure memory location used by a secure execution environment executed by the computing device. The method further locks the read-protected storage and configurations of the secure memory location and secure execution environment. The operating system is loaded into memory following the locking of the read-protected storage and locking of the configurations of the secure memory location and secure execution environment.

In another embodiment, a computing device configured to use read-protected storage to store data for firmware use includes a processor and volatile memory able to hold an operating system for the computing device. The computing device also includes non-volatile storage holding firmware. The firmware is configured to read data from read-protected storage during a boot sequence following a reset of the computing device. The read-protected storage is non-volatile and readable only during a time period between the reset of the computing device and a subsequent locking of the read-protected storage that prevents any further reads of the data in the read-protected storage until a subsequent reset of a memory device providing the read-protected storage is performed The firmware is further configured to copy the data or secondary data related to the data to a secure memory location used by a secure execution environment executed by the computing device. The firmware is also configured to lock the read-protected storage and lock configurations of the secure memory location and secure execution environment. Additionally the firmware is configured to load the operating system into memory following the locking of the read-protected storage and configurations of the secure memory location and secure execution environment.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 3C depicts an exemplary flash ROM device with read-protected storage and system memory with SMRAM used in copying drivers or firmware volumes into SMRAM by an embodiment of the present invention.

DETAILED DESCRIPTION

Figure 1:
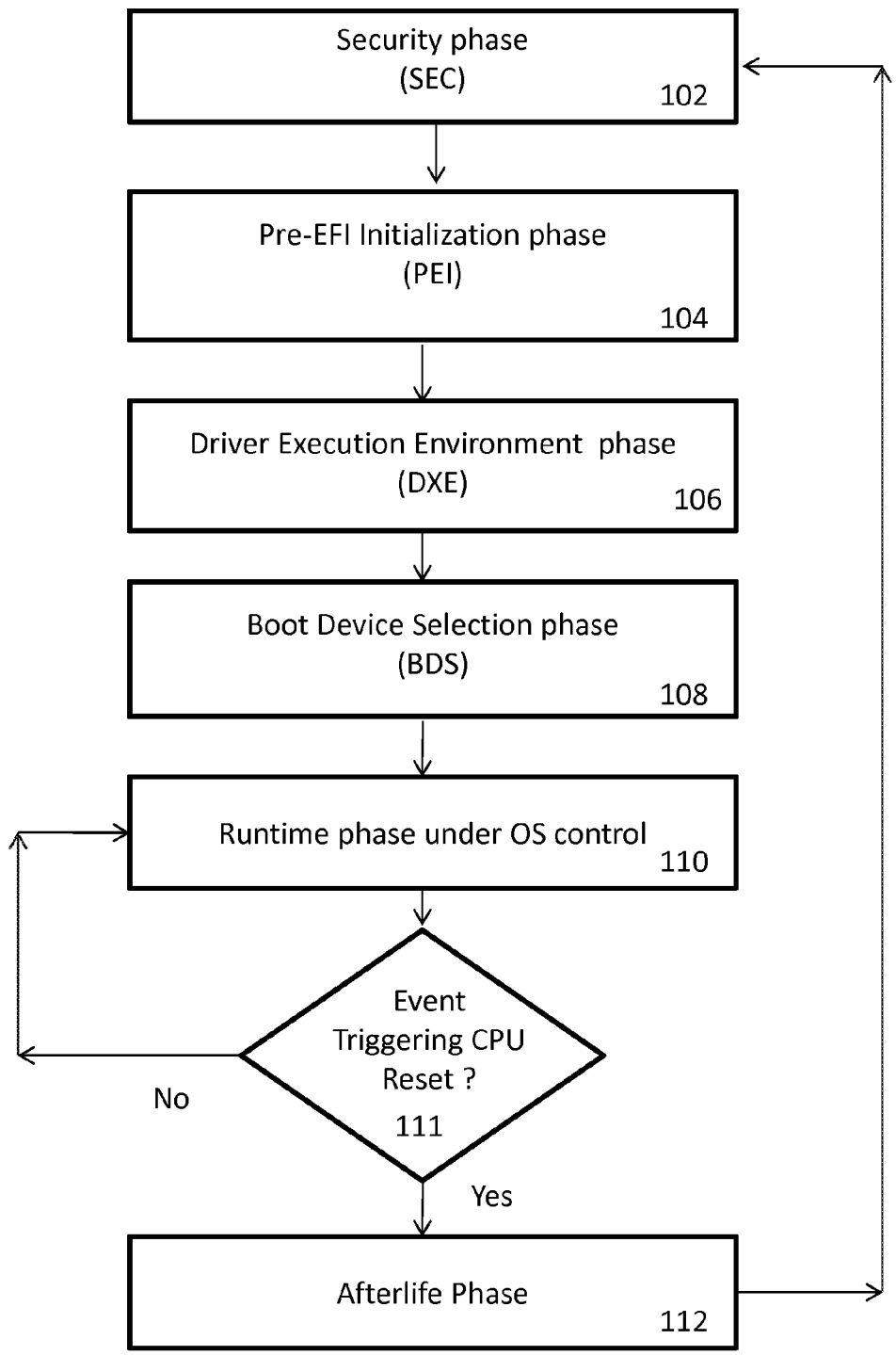
FIG. 1 (prior art) depicts an exemplary UEFI boot flow.

Embodiments of the present invention protect communication between trusted firmware and other firmware and operating system or remote management agents. Conventionally, in order for trust to be established between trusted firmware and these agents, cryptographic keys (typically asymmetric public keys) are employed to authenticate the information received from these agents. Unfortunately, there are limited means by which information from the trusted firmware to these agents can be authenticated as this would require the trusted firmware to use a signing key. Such a signing key would normally be embedded in the same flash ROM that contained the trusted firmware and, since the trusted firmware must be accessible to the CPU in order to execute, the signing key would be accessible to programs running on the CPU. Since the security of most cryptographic systems lies in the key, someone with access to the firmware's flash ROM device would be able to compromise system security by reading the key and creating spoofed data pretending to originate in the trusted firmware.

One conventional approach to address this issue and to protect the encryption/decryption keys has been to use a trusted platform module (TPM). The TPM can be used to hold keys that are never exposed and to perform cryptographic operations using the keys. However this requires a TPM be included in the computing device. Similarly, some CPUs have special operating modes in which only signed code or code in an internal flash ROM device is allowed to run and only that code is allowed to access keys stored within the CPU. However, this approach requires additional support by the CPU for the special operating mode. A further approach is to protect private keys in the firmware by obscuring the key by separately storing the keys or storing the keys or in some obfuscated form so that they are not easily recognizable but this technique requires an alternative storage process.

In contrast to conventional techniques, an embodiment of the present invention provides a small portion of a flash ROM device or other non-volatile storage that is read-protected and contains data. The read-protected storage is readable only during a time period following a reset of the computing device and before a subsequent locking of the read-protected storage that is performed prior to the loading of the operating system that prevents any further reads of the data in the read-protected storage until a subsequent reset of a memory device (such as flash ROM) that is providing the read-protected storage is performed. In one embodiment, the firmware uses a decryption key read from the read-protected storage to decrypt secondary data such as additional cryptographic keys and copy them into memory used by a secure execution environment such as SMM or TrustZone. In another embodiment, the firmware may read a key in the read-protected storage and use it to decrypt an encrypted UEFI SMM driver, a combination SMM/DXE driver or a firmware volume which are first copied into normal system memory before being scheduled to execute and copied to a memory location allocated to the secure execution environment as part of the boot sequence. Alternatively, in another embodiment, a non-encrypted UEFI SMM driver, a combination SMM/DXE driver or a firmware volume may be stored in the read-protected storage and copied into normal system memory before being scheduled to execute and copied to a memory location allocated to the secure execution environment as part of the boot sequence. Embodiments of the present invention provide a reduction in cost over conventional approaches which use some form of security coprocessor to prevent the keys and other data from being exposed.

As mentioned above, the firmware is responsible for the initialization of the computing device and the loading of the operating system. FIG. 1 depicts an exemplary boot sequence consistent with the UEFI Platform Initialization Specification performed by computing devices equipped with a UEFI-compliant BIOS. The exemplary boot sequence begins execution at the CPU reset vector with the Security (SEC) phase firmware beginning execution (step 102). The CPU reset vector is the default location from which the CPU will retrieve the first instruction for execution following a CPU reset. The SEC phase extends from the time of CPU reset until temporary RAM is available. Among other duties, the SEC phase handles platform restart events, creates a temporary memory store, for example by using processor cache as flat memory, and hands pointers to the temporary memory, temporary stack and a Boot Firmware Volume (BFV) to the Pre-EFI (PEI) phase firmware. The PEI phase (step 104) initializes memory for the driver execution environment (DXE) phase to start using drivers known as PEI modules (PEIM) which are contained in the BFV provided by the SEC phase. The final module executed in the PEI phase, called the DXE initial program loader (IPL) (DXE IPL or DXE Initial Program Load) transitions operation to the DXE phase. The DXE phase (step 106) initializes the system components such as chipsets and add-on cards. During this phase, code is executed that creates the secure execution environment in an allocated memory location in system memory. As an example of a secure memory location, a computing device's system memory may be divided into two regions: normal system memory, where the operating system and applications execute and the System Management Random Access Memory (SMRAM), where secure services and applications execute. The SMRAM is protected from examination by code executing in the normal system memory or hardware devices using Direct Memory Access (DMA). The SMRAM is initially visible as normal system memory until subsequently hidden later in the boot sequence. It should be appreciated that while the description herein mentions SMRAM, a term specific to the x86 system architecture, the concepts described herein are also analogous to the TrustZone and TrustZone secure memory terms used for ARM processors. The Boot Device Selection (BDS) phase (step 108) selects a boot device from which to load an operating system into memory. The runtime phase (step 110) refers to the time following completion of a boot sequence when the operating system has been loaded into memory and taken control of the computing device. The Afterlife (AL) phase (step 112) occurs when the computing device's firmware takes control back from the operating system after the operating system has shut down, for example as a result of a transition by the computing device to a low power state (step 111) such as a sleep state, and before a CPU reset occurs. As explained further below, embodiments of the present invention use the read-protected storage during the DXE phase to copy data or secondary data to the secure execution environment so that it will later be available to the firmware executing in the secure execution environment.

Figure 2:
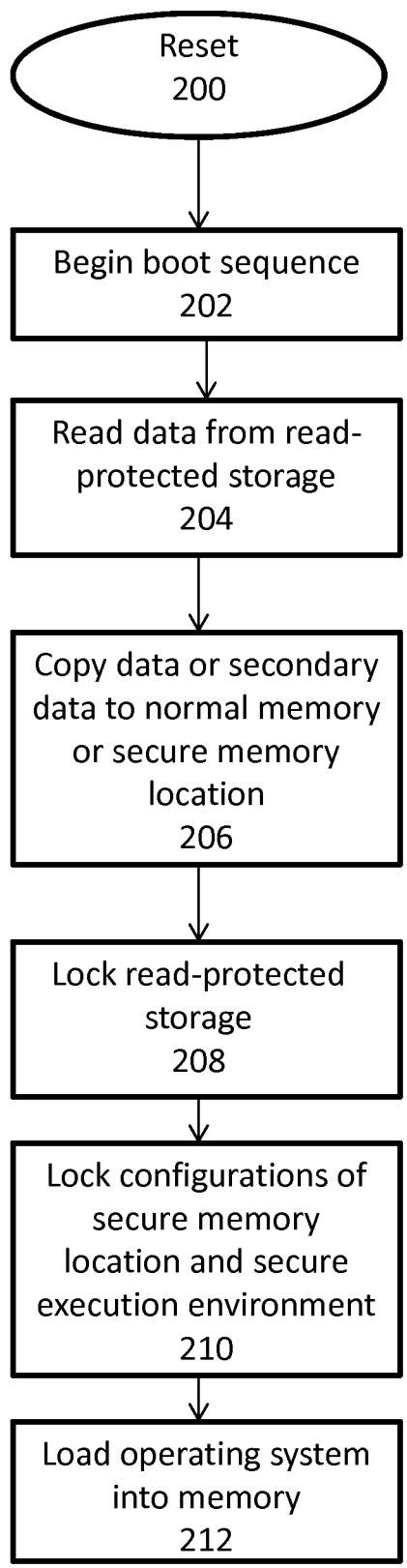
FIG. 2 depicts an exemplary sequence of steps performed by an embodiment of the present invention to utilize read-protected storage during a boot sequence.

FIG. 2 depicts an exemplary sequence of steps performed by an embodiment of the present invention to utilize read-protected storage during a boot sequence. As mentioned above, following the CPU reset (step 200), the boot sequence begins (step 202). The UEFI boot flow typically runs through two phases after the CPU reset (step 200), the SEC phase and the PEI phase. The PEI phase then launches the DXE phase during which, part way through the phase's execution, the SMM environment inside of SMRAM is created by one or more of the DXE drivers. As discussed above, the SMM environment is a CPU/CPU core operating mode entered by means of a System Management Interrupt (SMI#). The code that executes in this mode typically resides in a secure memory location (such as SMRAM) only accessible during SMM. During the period of the boot process in which SMM drivers are being loaded (the DXE phase), the portion of normal memory that will be later used as SMRAM is configured and CPUs are prepared to operate in SMM inside this memory, but SMRAM is not yet secure. This preparation includes configuring the CPU with the memory address to begin execution upon entry to SMM and the memory address where the CPU state information will be saved. In some cases, it also entails configuring the CPU's cache controller to allow SMRAM to be cached, to treat SMRAM in such a way that code or external hardware cannot snoop or alter the SMRAM contents (e.g.: Intel's SMRR).

Continuing with the sequence of FIG. 2, the data in read-protected storage is readable at this point of the boot sequence and the firmware of the present invention reads data in the read-protected storage (step 204). For example, the firmware may read a decryption key or keys from the data in the read-protected storage and then use it to decrypt secondary data located in the flash ROM device or elsewhere. Alternatively, the firmware may read data from the read-protected storage that is not encrypted. As explained further below, the data or secondary data may be copied directly to a secure memory location used by the secure execution environment or may first be copied to normal system memory before it is subsequently copied into the secure memory location later in the boot sequence (step 206). Once the data has been successfully read from the read-protected storage, the read-protected storage is locked (step 208) so that its contents cannot be read by any software or firmware, or any external hardware device. Typically this is done by writing a specific value or series of values to the storage device's configuration registers during the boot sequence. This read protection ensures that read cycles to the device return a pre-determined value or simply are dealt with in the method defined by the bus on which the device resides. The read-protection status of the read-protected storage cannot be changed except through a device reset. Typically, the reset of the flash ROM device is connected to the computing system's reset. Following the locking of the read-protected storage (step 208), the firmware continues to load more code in the SMRAM area as part of the boot sequence until no more code should be loaded and the OS is ready to be loaded into memory. The SMM and SMRAM configuration are finalized and the configuration is locked (step 210). For example, during a typical DXE flow, the end-of-DXE is an event that, when signaled, causes SMM drivers to prepare for secure operation. Also, SMRAM is closed (not accessible when not in SMM) and locked so that the configuration registers which control its configuration cannot be altered until a subsequent system reset. Likewise, other security-sensitive configuration registers are locked. The UEFI PI specification provides a mechanism for loading code into SMRAM and provides notifications adequate for informing the implementation when such a lock would be possible. Once the SMRAM is locked, the data or secondary data that have been loaded into SMRAM are no longer visible to external hardware or code executing in normal memory. The data or secondary data may subsequently be used only by code executing in SMM. Code in SMM may provide services to code in normal memory, acting as a proxy to perform operations, including cryptographic operations, with the data or secondary data but without exposing the data or secondary data to code operating in normal memory. These services are typically invoked using a software-generated SMI. After this protection is in place, the operating system is loaded into memory so that it can take control of operation of the computing device (step 212). The loading of the operating system may happen via the UEFI Boot Manager (UEFI specification) or the PI Specification (BDS phase).

Figure 3A:
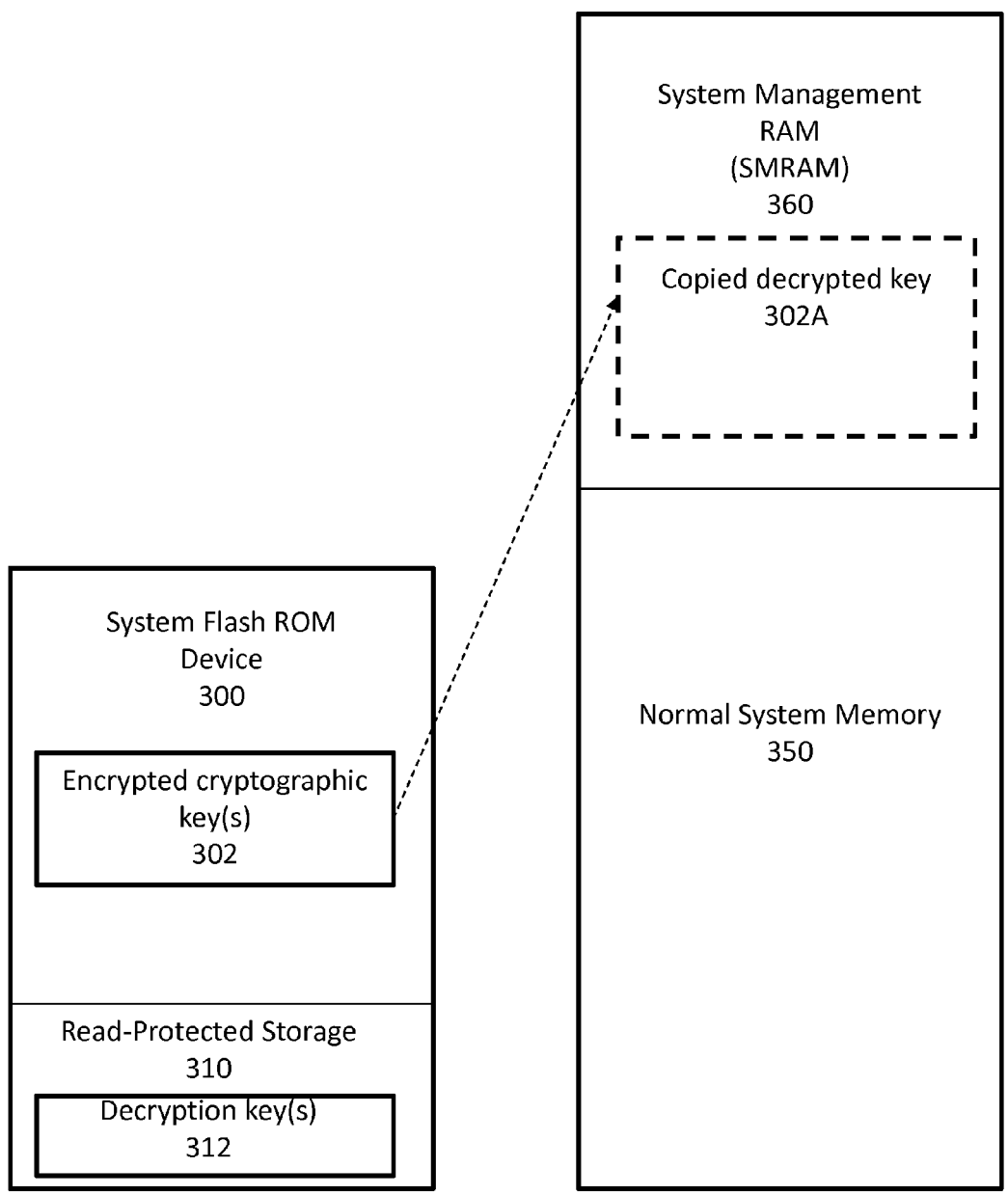
FIG. 3A depicts an exemplary flash ROM device with read-protected storage and system memory with SMRAM used in copying decrypted keys into SMRAM by an embodiment of the present invention.

In one embodiment, a decryption key is stored in the read-protected storage and used by the firmware to decrypt secondary data that includes other cryptographic keys so that the other cryptographic keys can be made available to a secure execution environment such as SMM. FIG. 3A depicts an exemplary flash ROM device with read-protected storage and system memory with SMRAM used to copy decrypted keys into SMRAM by one embodiment of the present invention. System memory in the computing device includes normal system memory 350 and the secure portion of memory, SMRAM 360, allocated for use by SMM. The system flash ROM device 300 has at least one region, read-protected storage 310, which is only readable after platform reset and before the read-protected storage is locked. Once the read-protected storage is locked, its contents cannot be read until a subsequent reset of the flash ROM device that provides the read-protected storage is performed. Typically, the reset of the flash ROM device is tied to the system or PCI reset signal. The read-protected storage 310 in the flash ROM device holds at least one decryption key 312. The firmware of the present invention uses the decryption key 312 to decrypt secondary data in the flash ROM device such as additional encrypted cryptographic key(s) 302. The firmware copies the decrypted cryptographic keys 302A to SMRAM 360 for use during SMM. The exact nature of the decryption key or keys may vary without departing from the scope of the present invention. For example, the decryption key may be one half of an asymmetric key pair or may be a symmetric key. As such, the read-protected storage may be very small (such as 32 bytes for a 256-bit AES key or 512 bytes for a 4096-bit RSA key). It will be appreciated that in other embodiments, there may be more than one key, of different types.

Figure 3B:
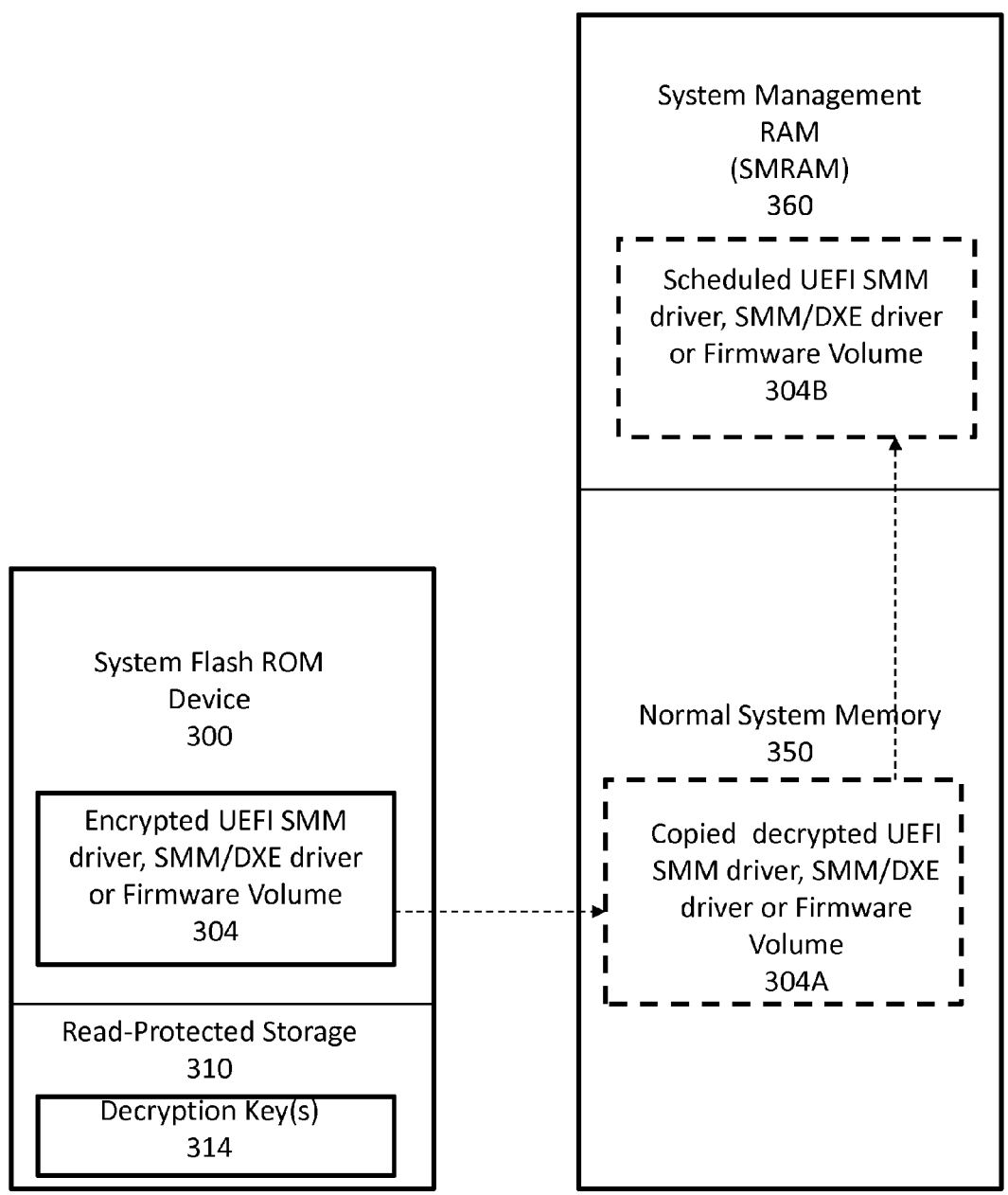
FIG. 3B depicts an exemplary flash ROM device with read-protected storage and system memory with SMRAM used in copying decrypted drivers or firmware volumes into SMRAM by an embodiment of the present invention.

In another embodiment, the data in read-protected storage includes a cryptographic key which is used to decrypt secondary data that includes drivers or a firmware volume which is copied into normal memory before being loaded into the secure execution environment. FIG. 3B depicts an exemplary flash ROM device with read-protected storage and system memory with SMRAM used in copying decrypted drivers or firmware volumes into SMRAM by an embodiment of the present invention. System memory in the computing device includes normal system memory 350 and the secure portion of memory, SMRAM 360, allocated for use by SMM. The system flash ROM device 300 has at least one region, read-protected storage 310, which is only readable after platform reset and before the read-protected storage is locked. The read-protected storage 310 in the flash ROM device holds at least one decryption key 314. The firmware of the present invention uses the decryption key 314 to decrypt secondary data in the flash ROM device such as UEFI SMM drivers, combination SMM/DXE drivers and/or firmware volumes (which contain the drivers) 304. The decrypted drivers or firmware volumes 304A are copied into normal system memory 350. Once in normal system memory, these drivers are scheduled to execute using normal UEFI Platform Initialization (PI) mechanisms. During platform initialization, the drivers 304B are copied into SMRAM 360 for execution during SMM. Alternatively, the decrypted drivers may be copied by the firmware directly into SMRAM for use during SMM instead of first being copied into normal system memory.

In another embodiment, non-encrypted UEFI SMM drivers, SMM/DXE drivers and/or firmware volumes may be stored in the read-protected storage of the present invention and copied to SMRAM for use during SMM. FIG. 3C depicts an exemplary flash ROM device with read-protected storage and system memory with SMRAM used in copying drivers or firmware volumes into SMRAM by an embodiment of the present invention. System memory in the computing device includes normal system memory 350 and the secure portion of memory, SMRAM 360, allocated for use by SMM. The system flash ROM device 300 has at least one region, read-protected storage 310, which is only readable after platform reset and before the read-protected storage is locked. The read-protected storage 310 in the flash ROM device holds at least one UEFI SMM driver, combination SMM/DXE driver and/or firmware volume (which contain the drivers) 316. The drivers or firmware volumes 316A are copied into normal system memory 350. Once in normal system memory, these drivers are scheduled to execute using normal UEFI Platform Initialization (PI) mechanisms. During platform initialization, the drivers 316B are copied into SMRAM 360 for execution during SMM. Alternatively, the drivers may be copied by the firmware directly into SMRAM for use during SMM instead of first being copied into normal system memory.

Figure 4:
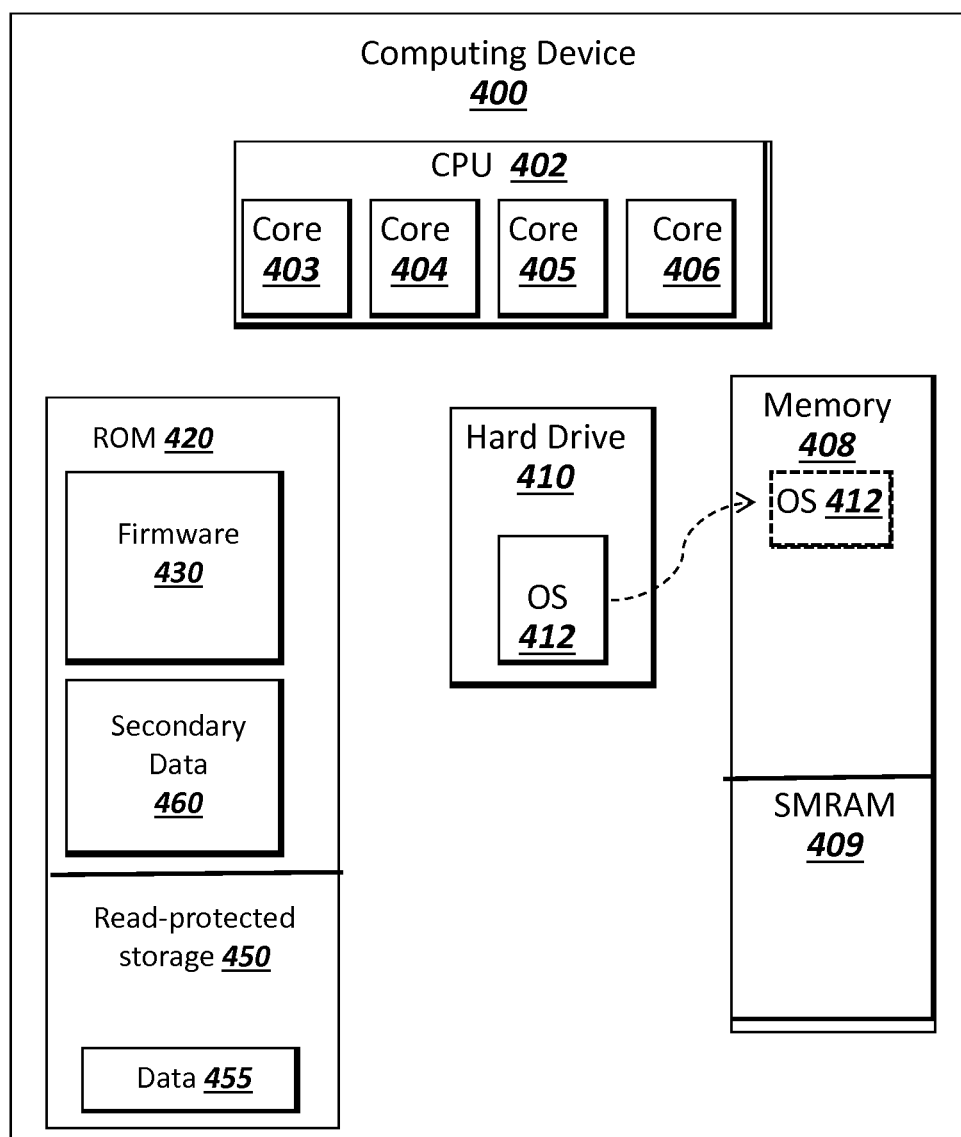
FIG. 4 depicts an exemplary environment suitable for practicing an embodiment of the present invention.

FIG. 4 depicts an exemplary environment suitable for practicing an embodiment of the present invention. A computing device 400 includes a CPU 402 used to process instructions. The CPU 402 may include multiple cores such as cores 403-406. The computing device 400 may be a UEFI BIOS-controlled computing device. The computing device 400 may be a PC, laptop computer, tablet computing device, server, smartphone or some other type of computing device. The computing device 400 may also include a memory 408 such as Random Access Memory (RAM). A portion of this memory 408 may be configured as SMRAM 409. An OS 412 that is stored on a hard drive 410 or other non-volatile storage that is in, or in a location in communication with, computing device 400 may be loaded into memory 408 as part of a boot process performed by the computing device.

The computing device 400 may also include ROM 420. ROM 420 may be a Flash ROM device and may be the system flash ROM device. In some cases the system design may incorporate multiple ROM devices holding firmware. ROM 420 may include firmware 430 as described above that is operable at different points of the computing device's operation. For example, firmware 430 may be operable during a boot sequence for computing device 400 and may be operable during SMM. Firmware 430 may also be operable when computing device 400 is executing in a normal operation mode under control of OS 412 (i.e. in a non-SMM protected mode). ROM 420 may include a read-protected storage area 450 holding data 455 that is only readable after a reset of the computing device and before an OS is loaded as described above. ROM 420 may also store secondary data 460 related to data 455. Secondary data 460 may be in read-protected area 450 or in a non-read protected area of ROM 420.

It will be appreciated that other embodiments of the present invention in addition to those specifically described above are also within the scope of the present invention. For example, other embodiments of the present invention may use TrustZone, TrustZone secure memory and related technologies, instead of SMM and SMRAM. Likewise, the read-protected storage and secondary data storage may be located in another flash ROM device other than the system flash ROM device. The storage locations may be located in some other form of non-volatile storage entirely. The storage locations may also exist in separate devices from each other.

In one embodiment in which a decryption key is stored in the read-protected storage, updates to the key are allowed only when using updated data signed by the previous key.

In an additional embodiment, secure storage may be used but not SMRAM. Rather, an application may be executed from read-protected memory, an application may be decrypted to normal memory from other non-volatile storage using a key stored in read-protected memory, or an application may be copied from read-protected storage to normal memory, and then executed once. In such cases, the application is executed in a secure environment (pre-OS) since it does not persist into an untrusted environment. UEFI applications terminate immediately upon exiting from the entry point.

In another embodiment, firmware updates the read-protected storage using the validated contents of secondary data storage. The secondary data is validated by verifying that it contains an update for the read-protected storage and this update has been signed using a key or a key pair of a key found in the read-protected storage. If the signature of the secondary data is valid, then the contents of the read-protected storage are updated using the contents of the secondary data. In this embodiment, the read-protected storage is optionally left unprotected (i.e. never enables the read-protection) initially until it has been programmed once. This allows the initial contents of the read-protected storage to be specified during the manufacturing process and then subsequently updated using a signed update.

In one embodiment, the firmware may generate the initial key from a random number and/or some other seed value, that is extended into a key using a method such as that described in PKCS#7. This allows each system to have a unique key that can be used by the firmware to encrypt data by itself, such as a user password, that needs to be stored in storage accessible to OS applications, and which cannot be compromised by the exposure of a key on another platform. The auto-generation by firmware further removes the need for a key to be installed by an installer.

In another embodiment, the configuration bit locking the read-protected storage is automatically set when the processor or platform silicon makes a transition from one state to another. This is useful when the initial code executed by the CPU is contained on an on-die ROM and the temporary RAM is also on-die such as is found on a System on a Chip (SoCs). In this case, SMM and SMRAM are configured before leaving the PEI stage. In this way, the read-protected storage contents are never exposed on external buses since all code and data execution is visible only on the SoC. As an example, a cache is often used as temporary RAM. When temporary RAM is disabled, the read-protection could be enabled. As another example, when the CPU begins executing outside of the on-chip ROM, the read-protection could be enabled. As another example, an on-die SRAM could be used for code execution and the read-protection enabled when execution begins in address ranges outside of those decoded by the SRAM.

In an alternative embodiment, the configuration bit for the read-protected storage is tied to the SMRAM/SMM configuration-lock bits. The configuration lock bits for SMRAM prevent access to the SMRAM while not in SMM and also prevent the configuration from being changed until the next reset so that the contents of SMRAM cannot be read or altered. When the SMRAM/SMM configuration lock bits are set, the read-protection on the read-protected storage is enabled.

In an embodiment, an application executing in normal memory may request data to be encrypted, decrypted or verified using one of the keys previously provisioned in secure memory using an API. For example, a user may type in a password and then, via a service call, the password may be compared to the encrypted version maintained by the firmware in secure memory, returning true or false depending on whether or not it was a match. The version of the password in secure memory may be encrypted using one of the provisioned cryptographic keys. Likewise, this user password or some other means of establishing trust for the application running in normal memory, may ask that a certain block of data be encrypted or decrypted using a key provisioned in secure memory. The operation occurs entirely within secure memory so that the key is never exposed. Untrusted applications or (by extension) users are not allowed to use the keys.

In one embodiment, in a system with encrypted transactions between components on the motherboard, the keys are not be exposed on the system buses (CPU bus, memory bus, flash bus) for capture by an attacker with an analyzer. In particular, it is difficult for someone with a flash reader/programmer to extract the contents from a flash device since the data would be recorded on the chip encrypted by a key known only to the system controller that communicated with it.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for using read-protected storage to store data for firmware use, comprising:
   executing firmware to read data from read-protected storage during a boot sequence following a reset of the computing device, the read-protected storage non-volatile and only readable during a time period between the reset of the computing device and a subsequent locking of the read-protected storage that prevents any further reads of the data in the read-protected storage until a subsequent reset of a memory device providing the read-protected storage is performed;
   copying the data or secondary data related to the data to a secure memory location used by a secure execution environment executed by the computing device;
   locking the read-protected storage;
   locking configurations of the secure memory location and secure execution environment; and loading an operating system into memory following the locking of the read-protected storage and configurations of the secure memory location and secure execution environment.

2. The method of claim 1, wherein the data includes at least one decryption key and further comprising:
decrypting secondary data using the decryption key; and
copying the decrypted secondary data to the secure memory location.

3. The method of claim 2 wherein the decrypted secondary data is at least one cryptographic key.

4. The method of claim 1, wherein the data includes at least one decryption key and further comprising:
decrypting secondary data using the decryption key; and
copying the decrypted secondary data to a normal system memory location accessible during computing device operation under control of an operating system prior to copying the decrypted secondary data to the secure memory location from the normal system memory location.

5. The method of claim 4 wherein the decrypted secondary data is at least one of a Unified Extensible Firmware Interface (UEFI) System Management Mode (SMM) driver, a combination SMM/Driver Execution Environment (DXE) driver and a firmware volume.

6. The method of claim 1, wherein the data is at least one of a UEFI SMM driver, a combination SMM/DXE driver and a firmware volume, and further comprising:
copying the data to a normal system memory location accessible during computing device operation under control of an operating system prior to copying the data to the secure memory location from normal system memory.

7. The method of claim 1 wherein the secure execution environment is SMM and the secure memory location is System Management Random Access Memory (SMRAM).

8. The method of claim 1 wherein the secure execution environment is provided by a processor that is based on a reduced instruction set computer (RISC) architecture.

9. A non-transitory medium holding computer-executable instructions for using read-protected storage to store data for firmware use, the instructions when executed causing at least one computing device to:
execute firmware to read data from read-protected storage during a boot sequence following a reset of the computing device, the read-protected storage non-volatile and only readable during a time period between the reset of the computing device and a subsequent locking of the read-protected storage that prevents any further reads of the data in the read-protected storage until a subsequent reset of a memory device providing the read-protected storage is performed;
copy the data or secondary data related to the data to a secure memory location used by a secure execution environment executed by the computing device;
lock the read-protected storage;
lock configurations of the secure memory location and secure execution environment; and
load an operating system into memory following the locking of the read-protected storage and configurations of the secure memory location and secure execution environment.

10. The medium of claim 9 wherein the data includes at least one decryption key and the instructions when executed further cause the computing device to:
decrypt secondary data using the decryption key; and
copy the decrypted secondary data to the secure memory location.

11. The medium of claim 10 wherein the decrypted secondary data is at least one cryptographic key.

12. The medium of claim 9, wherein the data includes at least one decryption key and the instructions when executed further cause the computing device to:
decrypt secondary data using the decryption key; and
copy the decrypted secondary data to a normal system memory location accessible during computing device operation under control of an operating system prior to copying the decrypted secondary data to the secure memory location from the normal system memory location.

13. The medium of claim 12 wherein the decrypted secondary data is at least one of a Unified Extensible Firmware Interface (UEFI) System Management Mode (SMM) driver, a combination SMM/Driver Execution Environment (DXE) driver and a firmware volume.

14. The medium of claim 9, wherein the data is at least one of a UEFI SMM driver, a combination SMM/DXE driver and a firmware volume, and the instructions when executed further cause the computing device to:
copy the data to the normal system memory location; and
copy the data from the normal system memory location to the secure memory location.

15. The medium of claim 9 wherein the secure execution environment is SMM and the secure memory location is System Management Random Access Memory (SMRAM).

16. The medium of claim 9 wherein the secure execution environment is provided by a processor that is based on a reduced instruction set computer (RISC) architecture.

17. A computing device configured to use read-protected storage to store data for firmware use, comprising:
a processor,
volatile memory able to hold an operating system for the computing device and non-volatile storage holding firmware, the firmware configured to:
read data from read-protected storage during a boot sequence following a reset of the computing device, the read-protected storage non-volatile and only readable during a time period between the reset of the computing device and a subsequent locking of the read-protected storage that prevents any further reads of the data in the read-protected storage until a subsequent reset of a memory device providing the read-protected storage is performed;
copy the data or secondary data related to the data to a secure memory location used by a secure execution environment executed by the computing device;
lock the read-protected storage;
lock configurations of the secure memory location and secure execution environment; and
load the operating system into memory following the locking of the read-protected storage and configurations of the secure memory location and secure execution environment.

18. The computing device of claim 17 wherein the non-volatile storage is system Flash Read-Only Memory (ROM).

19. The computing device of claim 17 wherein the secure execution environment is provided by a processor that is based on a reduced instruction set computer (RISC) architecture.

20. The computing device of claim 17 wherein the data or secondary data is a cryptographic key.

21. The computing device of claim 17 wherein the data or secondary data is at least one of a Unified Extensible Firmware Interface (UEFI) System Management Mode (SMM) driver, a combination SMM/Driver Execution Environment (DXE) driver and a firmware volume.

* * * * *